June 11, 1957 E. LEWIS 2,795,209
POULTRY WATERING AND FEEDING DEVICE
Filed Sept. 28, 1953
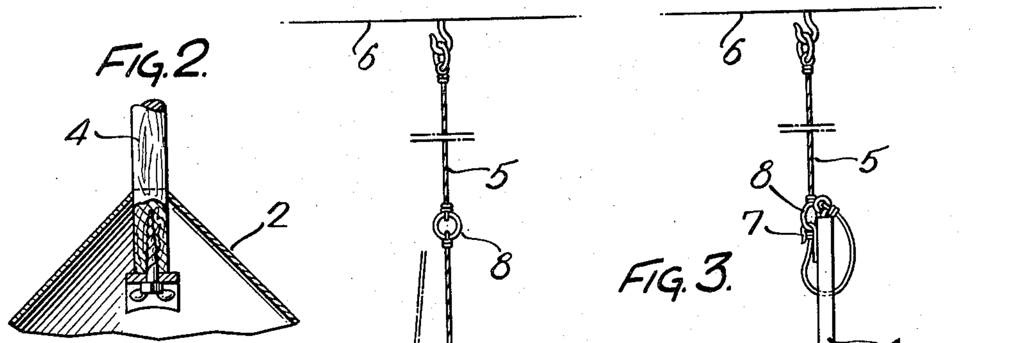
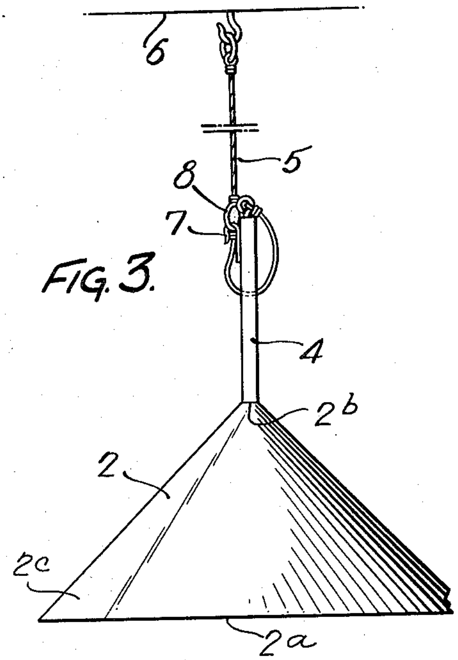
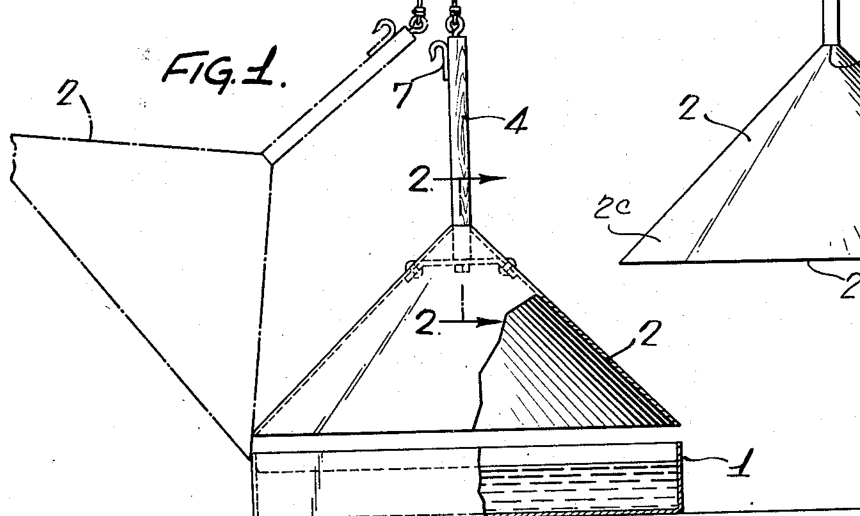
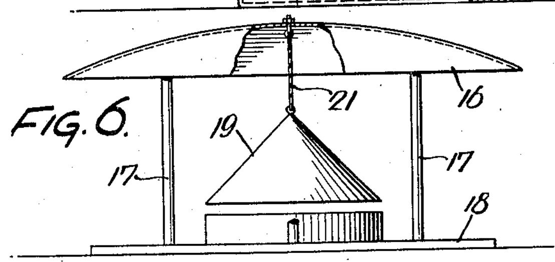
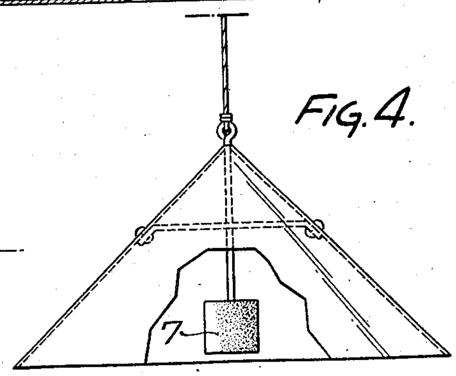
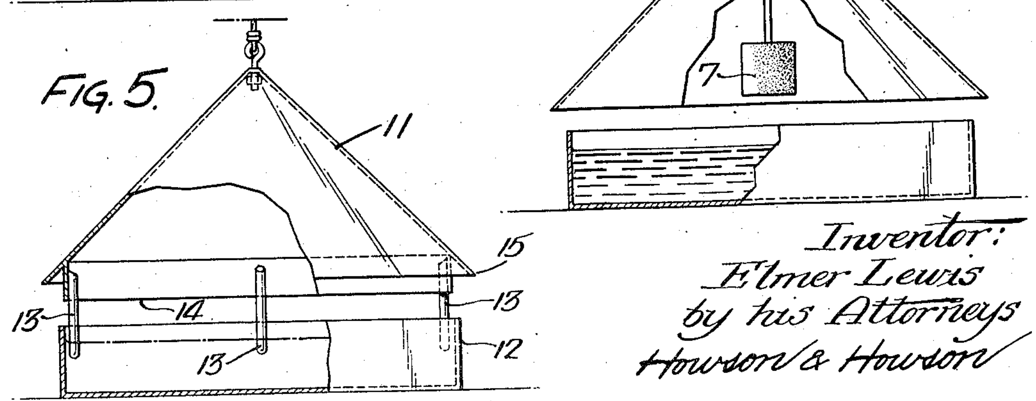
Inventor:
Elmer Lewis
by his Attorneys
Howson & Howson United States Patent Office 2,795,209

Patented June 11, 1957

1

2,795,209

POULTRY WATERING AND FEEDING DEVICE

Elmer Lewis, Eustis, Fla.

Application September 28, 1953, Serial No. 382,515

4 Claims. (Cl. 119—63)

This invention relates to improved poultry watering and feeding apparatus, and a principal object of the invention is to provide apparatus of this character which, while affording free access to the water or feed for the fowl, will effectively preclude contamination by the latter not only of the feed or water but also of the dispensing apparatus.

Another object of the invention is to provide dispensing apparatus of the stated class which shall be characterized by extreme simplicity of form, relative cheapness of manufacture, and high functional efficiency.

Still another object of the invention is to provide apparatus of the stated type which may be readily manipulated to afford free access to the interior of the apparatus for replenishment of the water or feed.

In the attached drawings:

Fig. 1 is a side elevational view partly in section of a preferred embodiment of the invention;

Fig. 2 is a sectional view on the line 2—2, Fig. 1;

Fig. 3 is an elevational view showing the hood in position for replenishment of water or feed, and for cleaning the receptacle;

Fig. 4 is an elevational and partial sectional view of a modified form of apparatus within the scope of the invention;

Fig. 5 is a view similar to Fig. 4 showing still another modification falling within the principle of the invention as hereinafter defined, and Fig. 6 is a side elevational and partial sectional view of a unit dispenser made in accordance with the invention.

The apparatus, in the preferred embodiment illustrated in Figs. 1 and 2 of the drawings, consists of a receptacle 1 of circular form which is adapted to hold the water or feed and which may be supported in relatively fixed position on a suitable base. Suspended above this receptacle is a conical hood 2 having a major diameter at its lower edge two way approximating the diameter of the receptacle 1. This hood may economically be made of thin sheet metal, such as tin or aluminum, and when so constituted is light in weight. Rigidly secured to apex 2*b* of the conical upper surface 2*c* of the hood by any suitable means is a substantially rigid rod 4, and the upper end of this rod is attached by means of a flexible cord 5, to the roof or flat ceiling 6 of the poultry shed or to any super structure which, like the ceiling 6, is devoid of any foothold sufficiently extensive to permit roosting of the poultry in a position directly above the hood. The conical hood 2 is of such vertical depth that the inclination of the sides thereof is sufficiently steep to preclude the roosting thereon of the fowl and if an attempt is made to perch upon the hood, the fowl will immediately slide down the smooth inclined surface of the cone.

It has been found that when a hood of this character is suspended freely from a flexible cord, the weight of the fowl may be sufficient when imposed even momentarily upon the hood to effect an immediate and rapid lateral displacement thereof about the apex of the cone as a center with the resultant deposition of the fowl into the receptacle 1; also, the weight and strength of the fowl may be sufficient to permit it to enter the receptacle from the side by simple forcible lateral displacement of the hood.

In order to preclude the possibility of such lateral displacement of the suspended hood, I have in the present embodiment employed the rod 4 which in itself has substantial rigidity and which is rigidly secured to the hood as previously set forth. The effect of this rod is not only to increase the overall weight of the suspended hood structure, but also, by lengthening the effective lever arm, to increase the impact or thrust force required to effect a given displacement of the hood with respect to the receptacle. Obviously, the resistance to lateral displacement of the hood by any impact force on the latter is a function both of the combined weight of the hood and the rod and of the length of the rod above the hood. Obviously, the weight and length of the rod will vary with the size of the fowl for which the apparatus is intended. The rod 4 may suitably be made of wood or other substantially rigid non-metallic material having the required weight; or the rod may suitably be made of metal.

It will be understood that the hood 2 is suspended at a height such that its lower edge is elevated above the top of the receptacle sufficiently to afford ready access for the head of the fowl to the interior of the receptacle while excluding the body. The relative spacing of the hood and receptacle, and also the height of the side wall of the latter, will also vary in accordance with the size and character of the fowl.

A desirable characteristic of the apparatus described above resides in the fact that when the hood is forcibly displaced from its normal position to one side of the receptacle, the lower edge of the hood may be made to engage the upper edge of the receptacle, as shown in broken lines in Fig. 1, so as to retain the hood in the displaced position. This affords free access to the interior of the receptacle for replenishment of the water or feed, or for cleaning. If it be desired to move the hood to an elevated position above the receptacle and to retain it temporarily in that position, this may be accomplished by providing a small hook 7 on the rod 4 and a loop 8 in the cord 5 in which the hook may be engaged.

The invention is susceptible to other embodiment without departure from the essential principle. In Fig. 4, for example, I have provided an annular weight element 7 in the lower part of the hood 2 in lieu of the rod 4. By thus increasing the weight of the hood itself particularly at its lower edge, I avoid the necessity for the increased lever arm afforded by the rod and have added sufficient weight and inertia to the hood to effectively preclude displacement thereof by the weight of a fowl attempting to roost upon the inclined cone surface. Other forms of weighting means may be employed either localized at the lower edge of the hood as in the present embodiment or distributed over the entire hood area. It is only necessary that the weight of the hood assembly with respect to its center of gravity be such as to afford an inertia great enough to resist the momentary thrust imposed by weight of the fowl against the inclined surface of the hood.

In the embodiment of Fig. 5, the hood 11 is suspended above the receptacle 12 in the same manner described above. In this case, however, the hood is provided with a set of depending pins 13 which extend downwardly at the inside of the side wall of the receptacle and act to prevent lateral displacement of the hood from its normal position above the receptacle. The pins do not interfere with the freedom for displacement of the hood in vertical direction. Obviously, the pins may be mounted on the receptacle instead of on the hood without change of function. In this embodiment the overall weight of the hood is immaterial.

Fig. 5 also shows a means for locating the lower edge of the cone in outwardly spaced relation to the wall of the receptacle. In this case the depending flange 14 of the hood defines the upper edge of the access space through which the fowl's head may enter the receptacle and the edge 15 of the cone is sufficiently remote to create no interference with the body of the fowl.

Fig. 6 shows a unit dispenser made in accordance with the principle of the invention. The unit consists in the present instance of a domed cover member 16 and means, in the form of legs 17, for supporting the said member in an elevated position above a suitable base surface 18. Beneath the cover is a typical coned hood 19 which is suspended at its apex from the center of the cover by means in this instance of a cord or wire 21 which supports the hood in position, as previously described, above a dispensing receptacle resting on the surface 18. Inertia means, also described above, effectively precludes significant displacement of the hood from above the receptacle, and the conical form of the hood, its mode of suspension, and the cover 16 prevent the fowl from taking a position on or above the hood wherein the droppings might contaminate the latter.

The apparatus described above in all its embodiments possesses the advantages of simplicity and cheapness of form and construction coupled with a high degree of sanitation arising from the effective exclusion of contaminating substances, particularly droppings, from the dispensing receptacle and its contents. This exclusion is attained by provision of special means for preventing significant displacement of the hood from the normal protective position above the receptacle, by forming the hood so that it is not susceptible to use as a roost, and by supporting the hood in a manner precluding the roosting of the poultry in any position of vertical alignment with the hood and with the hood exposed below the roost, so that the upper surface of the hood remains free from contaminating matter.

I claim:

1. In poultry watering or feeding apparatus, an open-topped receptacle, a hood freely suspended above and in vertical alignment with the receptacle, said hood having a conical upper surface extending substantially to the outer peripheral edge of the hood, suspension means extending from the apex of said conical surface and leaving said surface unobstructed and supporting the hood with its lower edge spaced from the upper edge of the receptacle to an extent affording access for the head of the fowl to the interior of the receptacle while excluding the body of the fowl, the said conical surface of the hood being too steep to provide even a momentary support for a fowl attempting to perch thereon, and means apart from the weight of the hood alone for effiectively resisting lateral displacement of the hood from the said aligned position by thrust imposed by said fowl such attempt to an extent admitting the fowl to the receptacle.

2. Apparatus according to claim 1 wherein the hood is suspended from a super structure of a character precluding the roosting of the poultry in positions above and in vertical alignment with the said hood and with the hood exposed to the poultry said roosting positions.

3. In poultry watering and feeding apparatus, an open-topped dispensing receptacle; a conical hood; means providing a ceiling surface over said hood and receptacle; means for suspending the hood at the cone apex thereof from the ceiling surface, said hood covering the receptacle and limiting access to the interior thereof to the head and neck only of the fowl, and said suspension means leaving the conical upper surface of the hood unobstructed except in the apex area and being free from projections that might serve as a perch for the fowl; the conical surface of the hood, the said suspension means, and the ceiling surface jointly precluding roosting of the poultry in a position from which droppings could impinge upon and contaminate the hood; and means for preventing lateral displacement of the hood by the poultry from above the receptacle.

4. Poultry watering and feeding apparatus according to claim 1 wherein the means for resisting lateral displacement comprises a substantially rigid rod rigidly attached to the apex of the hood and constituting at least a portion of the hood suspending means.

References Cited in the file of this patent

UNITED STATES PATENTS

| | | |
|---|---|---|
| 2,138,544 | Gulla | Nov. 29, 1938 |
| 2,267,883 | Wood | Dec. 30, 1941 |
| 2,530,911 | Schultz | Nov. 21, 1950 |
| 2,584,782 | Beckman | Feb. 5, 1952 |
| 2,591,126 | Breck | Apr. 1, 1952 |
| 2,643,637 | Lewis | June 30, 1953 |
| 2,666,415 | Scruggs | Jan. 19, 1954 |

OTHER REFERENCES

Popular Mechanics, June 1944, page 123.